(12) United States Patent
Ou et al.

(10) Patent No.: US 11,934,763 B2
(45) Date of Patent: Mar. 19, 2024

(54) METHOD OF REGULATING INTEGRATED CIRCUIT TIMING AND POWER CONSUMPTION

(71) Applicant: TAIWAN SEMICONDUCTOR MANUFACTURING COMPANY, LTD., Hsinchu (TW)

(72) Inventors: Hung-Chih Ou, Hsinchu (TW); Wen-Hao Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 209 days.

(21) Appl. No.: 17/093,131

(22) Filed: Nov. 9, 2020

(65) Prior Publication Data

US 2021/0056250 A1 Feb. 25, 2021

Related U.S. Application Data

(63) Continuation of application No. 16/434,418, filed on Jun. 7, 2019, now Pat. No. 10,831,978.

(60) Provisional application No. 62/692,399, filed on Jun. 29, 2018.

(51) Int. Cl.
*G06F 30/398* (2020.01)
*G06F 30/30* (2020.01)
*G06F 119/06* (2020.01)
*G06F 119/12* (2020.01)

(52) U.S. Cl.
CPC ............ *G06F 30/398* (2020.01); *G06F 30/30* (2020.01); *G06F 2119/06* (2020.01); *G06F 2119/12* (2020.01)

(58) Field of Classification Search
USPC ......................................................... 716/102
See application file for complete search history.

(56) References Cited

U.S. PATENT DOCUMENTS

| 7,653,519 | B1 | 1/2010 | Overhauser | |
|---|---|---|---|---|
| 2001/0010090 | A1* | 7/2001 | Boyle | G06F 30/39 716/105 |
| 2003/0131334 | A1* | 7/2003 | Suaya | G06F 30/367 716/113 |
| 2004/0009645 | A1* | 1/2004 | Yoo | H10B 43/30 438/315 |
| 2008/0150168 | A1* | 6/2008 | Tsuchiya | G06F 30/367 716/112 |
| 2014/0103345 | A1* | 4/2014 | Yang | H01L 27/124 438/158 |
| 2015/0213178 | A1* | 7/2015 | Lin | G06F 30/394 716/123 |

(Continued)

*Primary Examiner* — Mohammed Alam
(74) *Attorney, Agent, or Firm* — Hauptman Ham, LLP

(57) ABSTRACT

A semiconductor device includes a first circuit element, a layer of dielectric material, a first wire and a second wire in the layer of dielectric material, and an array of wires in the layer of dielectric material, wherein a first wire at a first track in the array of wires is electrically connected to the first circuit element, the first wire having a first width, a second wire at a second track in the array of wires has a second width different from the first width, and a third track in the array of wires between the first track and the second track is an empty track, and wherein the first wire is asymmetric with respect to the first track in the array of wires.

21 Claims, 9 Drawing Sheets

(56) References Cited

U.S. PATENT DOCUMENTS

| | | | |
|---|---|---|---|
| 2015/0379188 A1* | 12/2015 | Kahng | G06F 30/398 716/112 |
| 2020/0004919 A1* | 1/2020 | Ou | G06F 30/30 |
| 2020/0006318 A1* | 1/2020 | Lin | H01L 27/0886 |

* cited by examiner

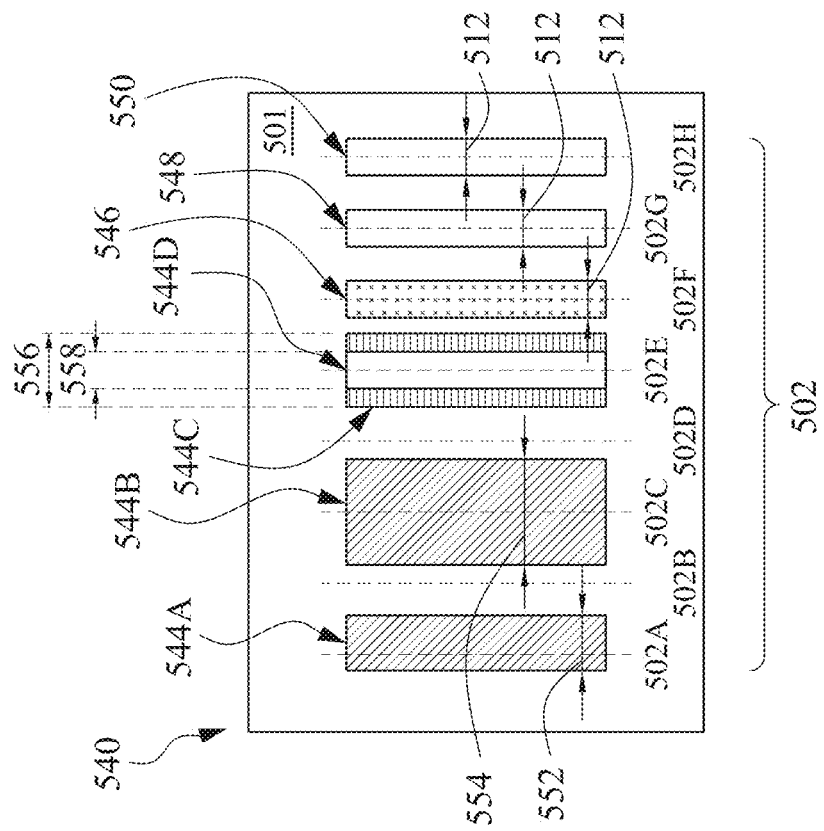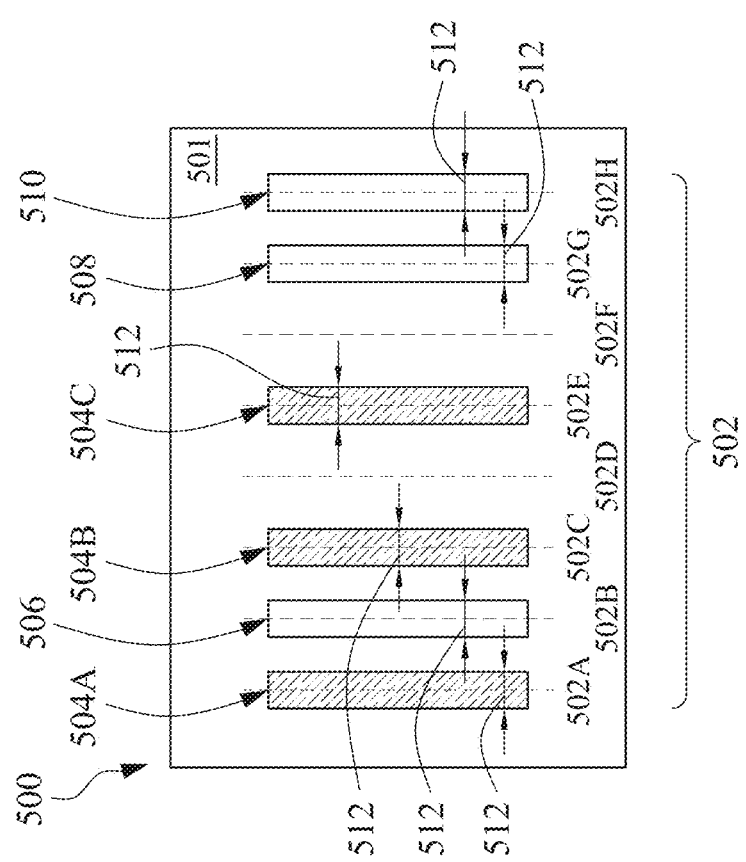
FIG. 5B
FIG. 5A

METHOD OF REGULATING INTEGRATED CIRCUIT TIMING AND POWER CONSUMPTION

PRIORITY CLAIM

This application is a continuation of U.S. application Ser. No. 16/434,418, filed Jun. 7, 2019, which claims the priority of U.S. Provisional Application No. 62/692,399, filed Jun. 29, 2018, which are incorporated herein by reference in their entireties.

BACKGROUND

Integrated circuit manufacturing includes steps intended to reduce defects in integrated circuits introduced during a manufacturing process. Wafer inspection and cleaning steps identify and remove particles from wafer surfaces to reduce interference with manufacturing operations of photoresist deposition, photolithography or pattern transfer, substrate etching, and/or filling of etched features with metal of optically-compatible materials.

Integrated circuit designs include features that protect a device from defects in the integrated circuit which were introduced during a manufacturing process. Duplicate or redundant device features provide back-up functionality when a primary device feature is damaged such as by a manufacturing defect.

BRIEF DESCRIPTION OF THE DRAWINGS

Aspects of the present disclosure are best understood from the following description when read with the accompanying figures. It is noted that, in accordance with the standard practice in the industry, various features are not drawn to scale. In fact, the dimensions of the various features may be arbitrarily increased or reduced for clarity of discussion.

FIGS. 5A and 5B are plan views of wires of an integrated circuit rearranged in a wire width adjustment process, in accordance with some embodiments.

DETAILED DESCRIPTION

Figure 1:
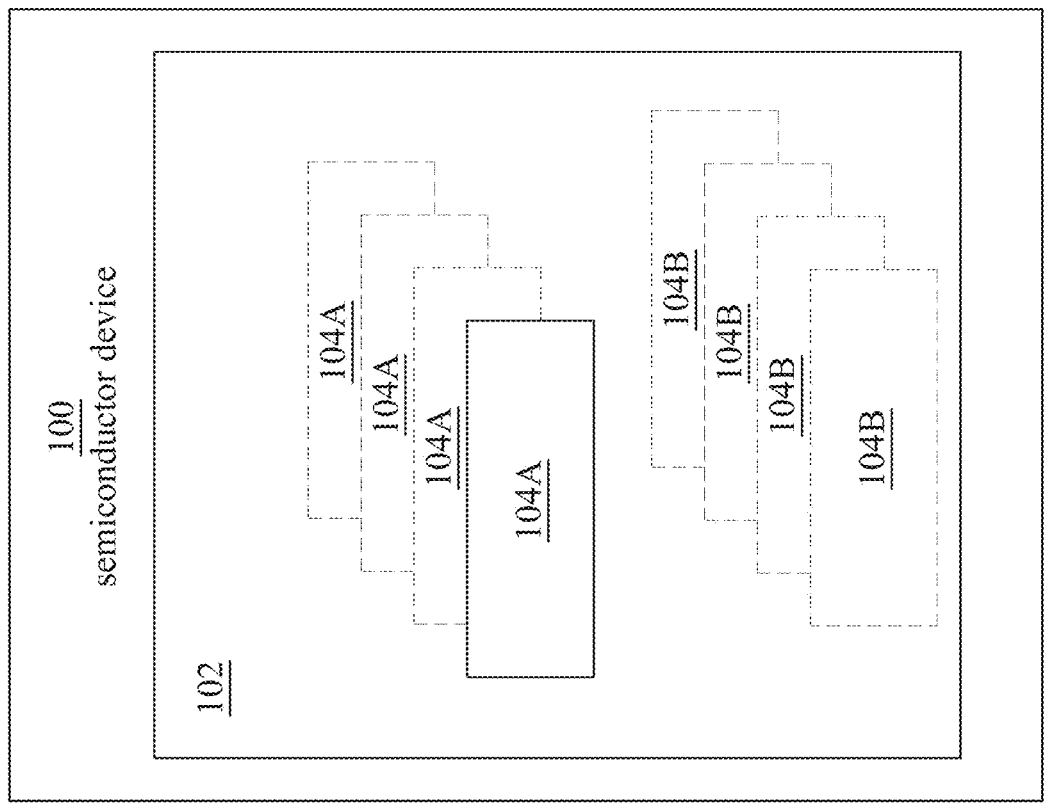
FIG. 1 is a block diagram of a semiconductor device in accordance with some embodiments of the present disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Integrated circuits contain wires that connect portions of the circuit that are spaced from each other. Some layers of the integrated circuit contain large numbers of interconnection wires. A computing system is used to generate and to modify designs and layouts of integrated circuits, including layers of an integrated circuit with interconnection wires, in order to help improve performance of an integrated circuit after a manufacturing process using the designs and layouts generated by the computing system. Integrated circuit manufacturing further includes operations directed toward preventing, or reducing, the frequency and impact of defects that occur during a manufacturing process. In some integrated circuit manufacturing processes, designs and layouts generated by a computing system are modified in order to reduce a likelihood of manufacturing defects. In some embodiments, designs and layouts are modified in order to tune performance of the circuit elements connected to the circuit features, or to tune the overall performance of the integrated circuit.

Some layers of an integrated circuit, including interconnect layers, contain wires and vias that connect transistors, memory cells, passive devices, or other components of an integrated circuit for the circuit to function. In some instances, wires in arrays of wires are laid out (arranged) with a minimum width and with a minimum separation interval determined according to design rules of the integrated circuit. Arranging the wires of an integrated circuit preserves order and conserves space in the overall circuit layout. Manufacturing defects such as opens (breaks in the wire that prevent current from flowing between the ends of the wire) become more frequent as wire size decreases and spacing between adjacent wires decreases. An integrated circuit with smaller wire sizes and smaller spacing intervals between wires is more susceptible to defects that prevent a wire from properly forming during processing steps such as photolithography deposition, pattern transfer, line etch, or metal deposition.

In some instances, integrated circuit manufacturers anticipate and work against manufacturing errors associated with wire opens by increasing the width of some wires in order to reduce a likelihood of a "fatal" defect, such as a wire open, from occurring. In some instances, a "fatal" defect is a defect in a semiconductor device that prevents some or all of a semiconductor device from functioning as intended. In some embodiments, wire widening, also known as wire width adjustment, is performed on isolated wires in an interconnect layer. In some embodiments, wire widening is performed on selected wires in an array of wires, where the selected wires adjoin open space or empty positions (empty tracks) in the array of wires. In some embodiments, wire widening includes first increasing, and then decreasing, the width of a wire before arriving at a second wire width that is larger than the initial wire width. In some embodiments, wire widening includes making a single width adjustment from an initial wire width to a second wire width larger than the initial wire width.

In some embodiments, when a wire undergoes width adjustment, an edge of the wire closest to an empty position, is moved closer toward the empty position, or into the open space. In some embodiments, both the sides of the wire are adjusted to modify the width of the wire at a position on the wire near the empty position or open space. In some embodiments of widened wires, a wire having an open space/empty position on both sides of the wire is widened in both directions (e.g., both sides of the wire are shifted outward toward the nearest empty position of the array to the side being shifted). An unwidened wire has an initial wire width. A widened wire has a second wire width, larger than the initial width of the wire. According to some embodiments, when an array of wires has an open space/empty position, wires on each side of the open wire space are widened toward the empty position in the array. In some embodiments, when wires at positions in an array of wires undergo widening, a minimum spacing between wires is preserved. In some embodiments, the minimum spacing is preserved in order to help prevent inadvertent coupling of neighboring wires, or to help prevent breakdown of dielectric material between neighboring wires.

FIG. 1 is a block diagram of a semiconductor device 100, in accordance with at least one embodiment of the present disclosure. In FIG. 1, semiconductor device 100 includes, among other things, a circuit macro (hereinafter, macro) 102. In some embodiments, macro 102 is a transistor macro. In some embodiments, macro 102 is a macro other than a transistor macro. In some embodiments, macro 102 is an interconnection structure macro. Macro 102 includes, among other things, one or more standard-cell-adapted arrangements 104A. In some embodiments, macro 102 includes a plurality of interconnection wires on a same layer of an integrated circuit. In some embodiments, macro 102 includes, among other things, one or more wire arrangements 104A-B. In some embodiments where one or more wire arrangements 104A-B are included, arrangement 104A differs from arrangement 104B. Examples of each of wire arrangement 104A and 104B include portions of semiconductor devices fabricated based on corresponding layout diagrams shown in each of FIGS. 5A-5B, 6A-6B, and 7A-7B or the like.

Integrated circuits include groups of circuit components configured to perform predetermined circuit functions. Examples of such integrated circuit (IC) functions include receiving signals, sending signals, communication between components of an IC and on other ICs, storing data, performing calculations, managing IC functionality (memory controllers, IC timing circuit elements, and so forth), or other suitable functions. Groups of circuit components may be pre-configured as standard cells that are arranged in an integrated circuit layout process prior to an integrated circuit manufacturing process. Standard cells facilitate simplified circuit performance simulation using the predetermined blocks, or standard cells, of the circuit design. Some embodiments of standard cell libraries include purely digital circuit components. Some embodiments of standard cell libraries include purely analog circuit components. Some standard cell libraries include mixtures of digital and analog circuit components configured to work together in a single integrated circuit.

In some instances, integrated circuit manufacturing involves using standard cells in cell libraries to simplify a design process for integrated circuits. In some embodiments, simplified design processes using standard cells in libraries limits a manufacturer's ability to maximize circuit component density of an integrated circuit. Standard cells have a standard cell length in a first direction and a standard cell width in a second direction (different from the first direction) so that cell borders of adjoining cells align. In some embodiments, integrated circuits contain wires that connect cells of the integrated circuit. In some embodiments, the second direction is perpendicular to the first direction. The wires of an integrated circuit interconnection structure are oriented along the first direction, the second direction, or a third direction angled with respect to the first and second directions. Some cells of integrated circuits contain arrays of interconnection wires. In some embodiments, wires are positioned at regularly spaced positions (or "tracks") in an array of wires. In some embodiments, a cell having an array of wires is completely populated by wires (e.g., each position of the array of wires has a wire located thereon). In some embodiments, an array of wires is incompletely populated (e.g., one or more positions of an array of wires is free of a wire). Widths of wires in an array of wires, or individual wires, of an integrated circuit are adjusted in a layout of an integrated circuit, to produce preconfigured layouts with predictable and consistent performance and known layers of interaction between parts of the pre-configured layout. Integrated circuit design aims to reduce interference, and to maintain performance of circuit elements within desired parameters. To help preserve performance characteristics of the cells within anticipated ranges in completed circuits, some wires of an array of wires are broadened (e.g., widened, or spread) in order to reduce a likelihood of circuit-destroying defects during a manufacturing process.

Figure 2B:
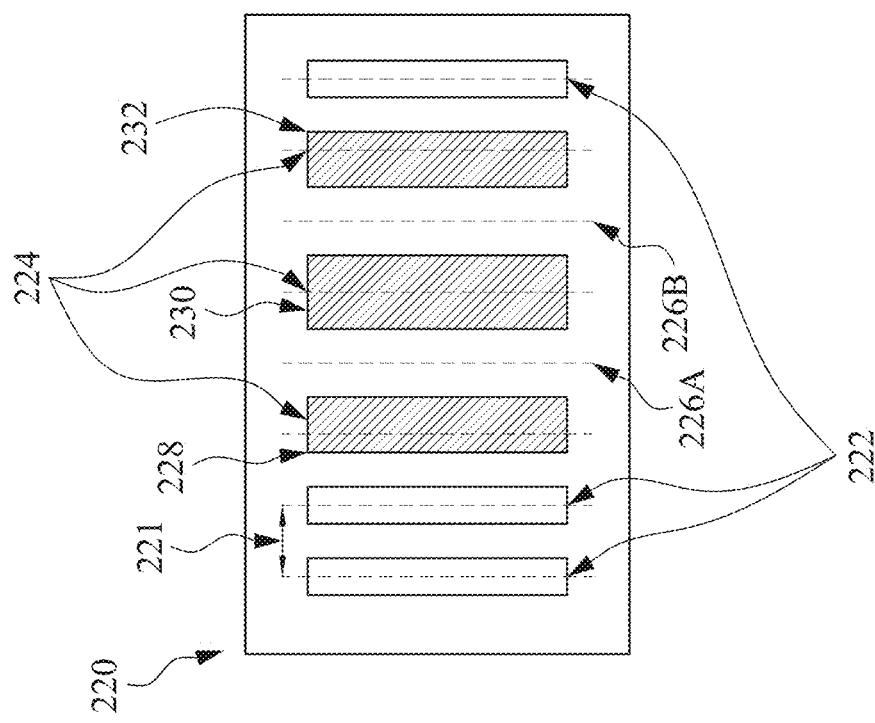
FIGS. 2A and 2B are plan views of wires of an integrated circuit before and after a wire width adjustment process, in accordance with some embodiments.
Figure 2A:
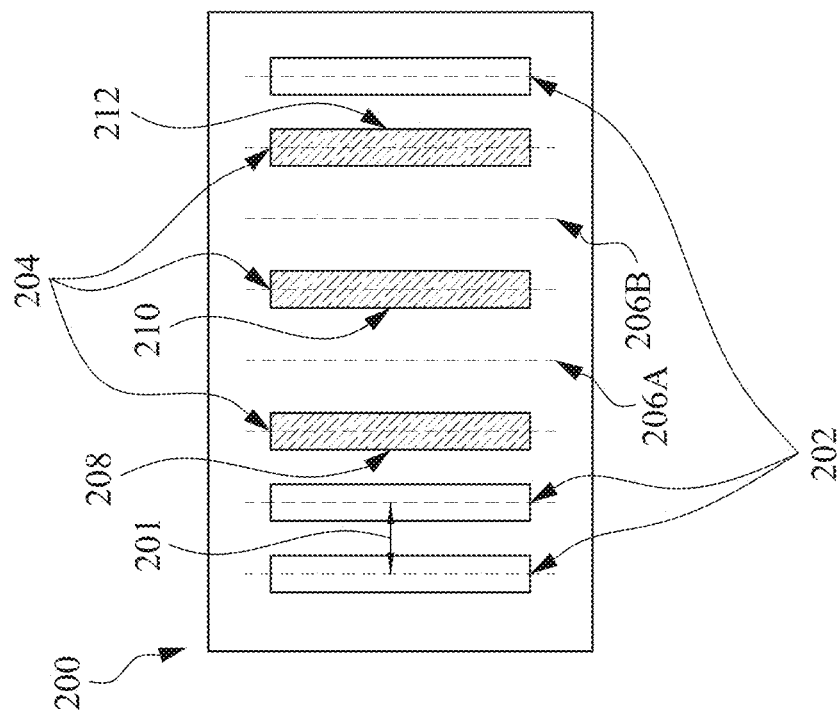

FIG. 2A is a plan view of an array of wires 200 of an integrated circuit, where the wires in a first set of wires 202 in the array are separated from open positions 206A and 206B in the array by a second set of wires 204. The wires in the second set of wires 204 each adjoin at least one open position of the array. Wires of the array 200 are separated by a separation interval 201, which repeats through the array of wires 200. Wire 208 adjoins a single open position 206A, wire 212 adjoins a single open position 206B, and wire 210 adjoins both open position 206A and 206B. According to wire width adjustment practices, each of wires 208, 210, and 212 are candidates for wire widening because the wires adjoin open positions in an array of wires. Although FIG. 2A includes wires in an array of wires, the present disclosure is not limited to embodiments of arrays of wires in an integrated circuit, but encompasses single wires, pairs of wires, and wires that adjoin non-wire features of an integrated circuit, and are capable of undergoing width adjustment as disclosed herein from an original wire width in order to reduce a risk of opens or other defects during a manufacturing process.

FIG. 2B is a plan view of an array of wires 220 of an integrated circuit, where the wire separation interval 221 is the same as wire separation interval 201, and the order of wires in the array 220 corresponds to the order of wires in array 200. A first set of wires 222 contains wires that do not adjoin open positions 226A and 226B of the visible portion of the array, and wires in second set of wires 224 do adjoin the open positions 226A and 226B. Wires of first set of wires 222 correspond in size and position (within the array 220) to wires of first set of wires 202 in FIG. 2A, whereas wires of second set of wires 224, while corresponding in position (within the array 220) to wires of the first set of wires 204 in FIG. 2A, have larger widths than corresponding wires of set of wires 204 of FIG. 2A. Wire 228 is wider than wire 208 and is widened toward (i.e., extended widthwise a distance on one side of the spacing interval) open position 226A. Wire 232 is wider than wire 212, and is widened toward open position 226B. Wire 230 is wider than wire 210, and is widened toward both (i.e., extended widthwise a distance on both sides of the spacing interval) open space 226A and open space 226B. FIG. 2B is a result of universal width adjustment in an integrated circuit, where each wire that is qualified for width adjustment, by being adjacent to open space or an open position in a wire, is widened to widen the wire to a width larger than the original width. In some embodiments, wire width adjustment is partial, where some wires are width adjusted, and some wires are left unmodified (e.g., not width-adjusted) despite there being open space or empty positions in the layout of wires adjoining the unwidened wires.

In some embodiments, not all wires that qualify for width adjustment are modified to have an increased wire width. Although a risk of "fatal" defects is reduced with universal width adjustment, widened wires are subject to greater amounts of capacitive coupling to ground, to other wires or circuit elements, and draw larger amounts of power than unwidened wires. Capacitive coupling adversely impacts switching speed/frequency of elements in the integrated circuit, and increased power draw increases circuit heating and, in devices with batteries or stored power, reduces the time a device is operable without recharging.

The detrimental aspects of width adjustment (e.g., increased power draw and slower switching speeds, inter alia) are mitigated to preserve the benefits of width adjustment (protection against feature-destroying defectivity) by reducing the degree of widening of some wires in a layer of an integrated circuit, or by reducing the number of wires that are widened to be smaller than the number of wires that are qualified for width adjustment. Determining whether to reduce the amount of widening for a wire, or determining whether to widen a wire at all, is accomplished by comparing a modeled or calculated RC (resistance/capacitance, or "electrical") performance of a wire in an integrated circuit before widening, after widening, and after a wire widening adjustment, to evaluate the effect of widening a wire on an integrated circuit, or a component thereof, and whether full-widening of the wire is detrimental to power consumption and switching speed of the integrated circuit or component. Calculating an RC, or electrical, performance of a wire, or an array of wires, prior to widening enables selection of wires for subsequent width adjustment to a different wire width than the initial widened wire width. Calculating an RC, or electrical, performance of a wire, or an array of wires, after width adjustment, enables width adjustment to adjust power consumption and switching frequencies of wires, or arrays of wires, to conform the IC to one or more performance thresholds or performance specifications.

Figure 3A:
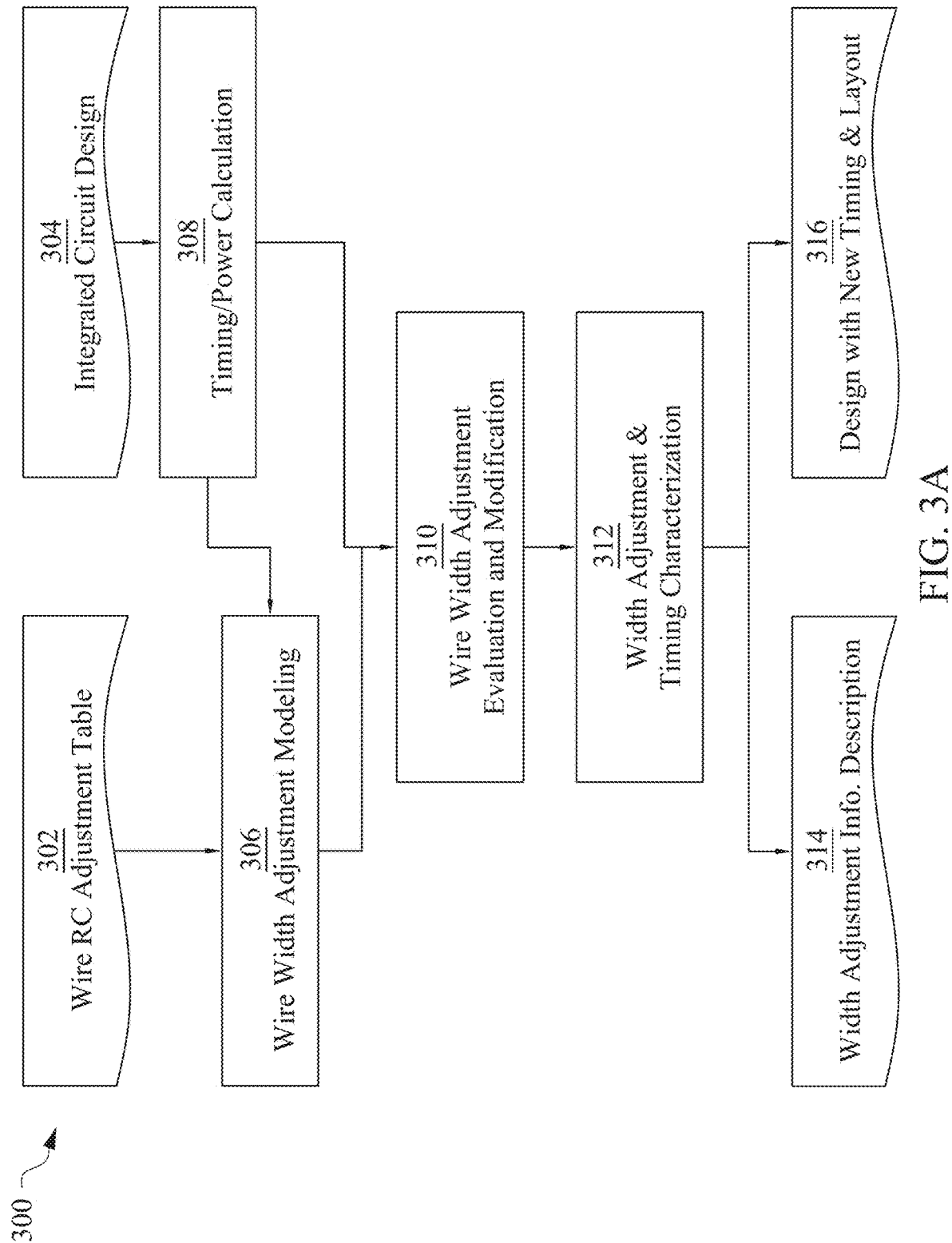
FIGS. 3A and 3B are flow diagrams of methods of regulating a wire width adjustment process, in accordance with some embodiments.

FIG. 3A is a flow diagram of a method 300 of regulating wire width in an integrated circuit, in accordance with some embodiments. In method 300, an operation 302 includes steps associated with generating a wire resistance/capacitance (RC) table and providing the RC table to an electronic design automation (EDA) system as disclosed hereinbelow. In some embodiments, an EDA system is used to generate electronically formatted computer readable media having stored thereon coded instructions for generating a layout of a layer of an integrated circuit, according to some embodiments.

In method 300, an operation 304 includes steps associated with generating design rules for an integrated circuit, and providing the generated design rules to the EDA system as disclosed hereinbelow. Generating design rules for an integrated circuit includes generation of spacing, capacitance, and resistance limits that are to be met to produce an integrated circuit having a predetermined set of performance results.

Method 300 includes an operation 306, in which a computer system performs wire width adjustment modeling. In some embodiments, wire width adjustment modeling includes operations associated with identifying wires in the layers of the integrated circuit that are candidate wires for subsequent wire width adjustment evaluation. In some embodiments, the computer system is an electronic design automation (EDA) system or some other computing device configured to operation according to instructions saved on the device, or a connected device, to adjust wire width in a layer of the integrated circuit. In some embodiments, operation 306 received input, such as the wire RC adjustment table, from operation 302 in order to perform the wire width adjustment modeling.

Method 300 includes an operation 308, in which the timing and power consumption of wires in at least one layer of the integrated circuit are evaluated to evaluate overall power consumption and switching speed of the integrated circuit. In some embodiments, operation 308 includes determining an average speed of the integrated circuit, and identifying individual wires having a switching speed, or being connected to circuit elements that have a switching speed, that is below the average speed of the integrated circuit or integrated circuit layer. In some embodiments, operation 308 includes evaluation of individual wires for parasitic capacitance effects that reduce switching speed of the individual wires, or circuit elements directly connected to the individual wires.

Method 300 includes an operation 310, in which wire width adjustment is evaluated and modified. In some embodiments, wires identified for width adjustment in operation 306 are subjected to additional evaluation. In some embodiments, the additional evaluation includes determining, based on the size of the unfilled space, or open area near a wire that is a candidate for width adjustment, the amount of width adjustment the wire is able to undergo without interfering (with, e.g., increased parasitic capacitance) with operation of neighboring wires or other circuit elements in the layer of the integrated circuit. In some embodiments, once a wire undergoes width adjustment, the wire is subjected to further evaluation to determine the performance of the width-adjusted wire, and nearby wires, and, when the performance of the nearby wires, or the width-adjusted wire, are adverse influenced by the width adjustment, the first adjusted width of the width-adjusted wire is decreased to a second adjusted width that does not interfere with the performance of nearby wires in the layer of the integrated circuit, and still retains improved performance characteristics before the initial width adjustment.

Method 300 includes an operation 312, in which the timing and the power consumption of the width-adjusted wires, whether after the first adjustment or after a second width adjustment, is evaluated. In some embodiments, the overall performance of the integrated circuit, or of the layer of the integrated circuit, is characterized to determine whether further width adjustment is warranted.

Method 300 includes an operation 314, in which information related to the width of wires in a layer of the integrated circuit, including both un-adjusted and width-adjusted wires, resulting from at least operations 310 and 312, is stored in a computer-readable storage medium and transmitted to an EDA system as described hereinbelow.

Method 300 further includes an operation 316, in which the information from un-adjusted and width-adjusted wires, resulting from at least operations 310 and 312, is used to generate a design or layout of at least one layer of an integrated circuit for use in a manufacturing process to meet timing and performance specifications of the integrated circuit, as provided to the design process described by operation 304, as described above.

Figure 3B:
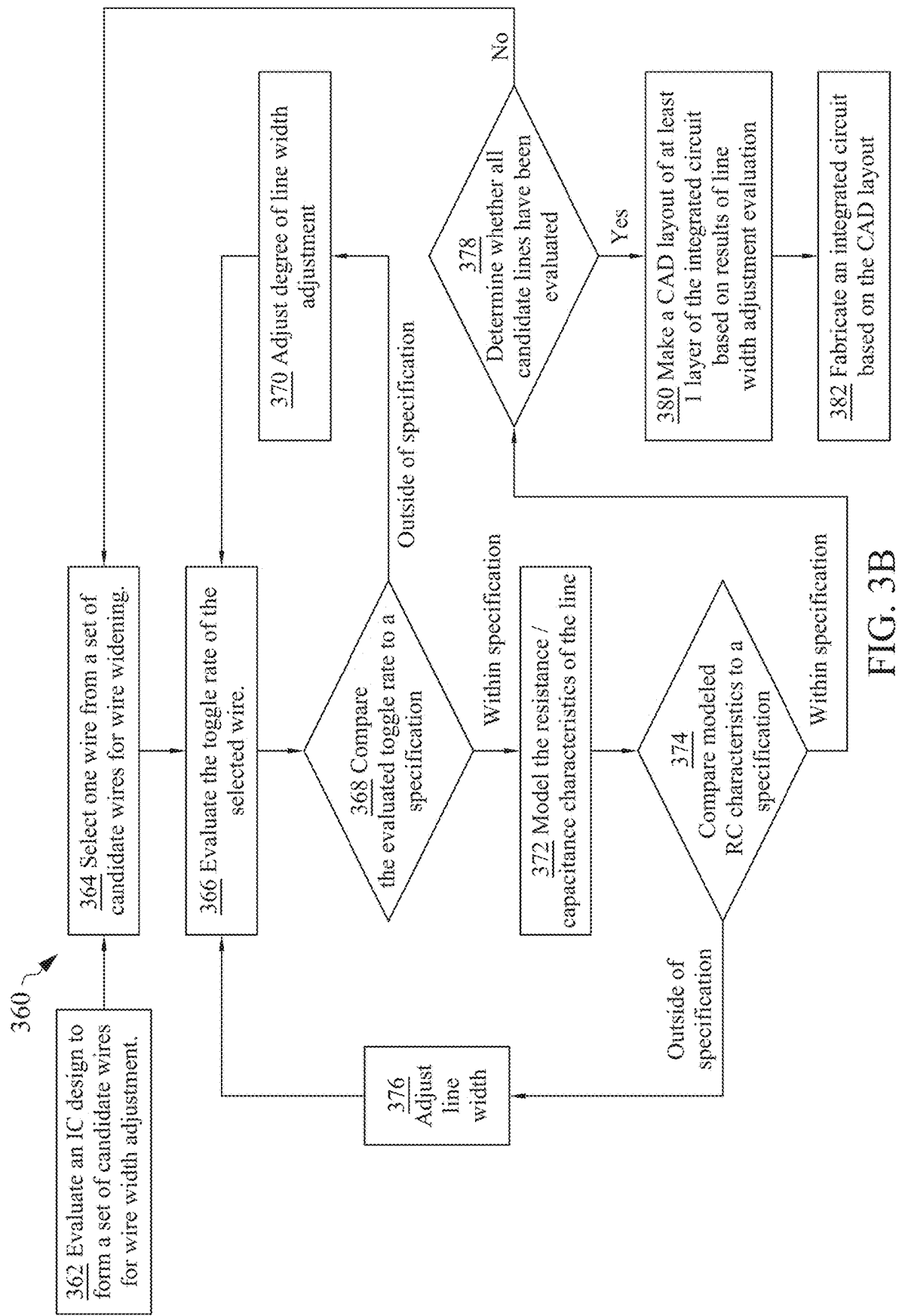

FIG. 3B is a flow diagram of a method 360 of regulating a width adjustment process, in accordance with some embodiments. Method 360 includes an operation 362, in which an integrated circuit design undergoes width adjustment. In some embodiments, width adjustment includes a first step where the wires are evaluated and/or modelled for widening, and a second step where a widening amount for each widened wire is determined for the array of wires. Width adjustment modeling is performed during integrated circuit evaluation, development, and/or design phases of a manufacturing process, prior to deposition of materials onto a substrate and etching and/or filling etched channels for wires in the substrate. Width adjustment modeling is performed using a wire RC widening table and a design of an integrated circuit. RC widening tables include rules, or guidelines, based on a technology node of an integrated circuit at a manufacturer, to widen (or, broaden, or spread) wires of the integrated circuit to reduce a likelihood of defects of the IC in the wiring regions of the circuit. Defects that are less likely with width adjustment include blocked etch, blocked pattern transfer (e.g., photolithography, or e-beam lithography), blocked metal fill, or some other manufacturing defect associated with making a wire in an integrated circuit. In some embodiments, width adjustment tables include guidelines regarding a recommended maximum change of a wire width, recommended minimum change of a wire width, guidelines regarding the proximity of two wires before one or more of the two wires is widened or spread, guidelines regarding a separation of adjacent wires subsequent to widening one or more of the adjacent wires, and/or guidelines regarding selecting one, or both, of two wires that adjoin an open space in an array of wires, or at an edge of an array of wires, for widening. Width adjustment includes analyzing wire positions for adjoining open positions in the arrays of wires in an integrated circuit, and/or wires that are adjoined by other wires, but are desired to undergo width adjustment, are identified and one or more of the adjoining wires are relocated to open positions elsewhere in the integrated circuit.

Method 360 includes an operation 364 wherein a wire of the IC design is selected for evaluation. In some embodiments of the method, all wires in an IC design are selected for evaluation. In some embodiments of the method, only wires that are widened in operation 305 are selected for evaluation. In some embodiments of the method, wires that are widened in operation 310, and adjoining wires in a wiring layout, are selected for evaluation.

Method 360 includes an operation 366, wherein each selected wire from operation 364 is evaluated to determine a toggle rate (that is, a switching speed/frequency of the wire are calculated). Evaluating a toggle rate of a wire involves calculating the modeled toggle rate, or switching frequency, of the wire for a pre-widening and a post-widening wire width. In some embodiments, toggle rates are measured after a manufacturing process to verify that a calculated toggle rate or switching frequency matches the measured toggle rates or switching frequencies. A toggle rate or switching rate is a measurement of the frequency with which a signal is propagated along a wire. In some embodiments, width adjustment modeling includes an input regarding the modeled switching rate, tolerances, or signal transmission delays of wires in an integrated circuit based on a particular design. In some embodiments of width adjustment modeling, when the toggling rates of wires, or signal transmission delays on those wires, are larger than a predetermined threshold, the number wires in the set of wires to be widened is modified in order to prevent degradation of the overall performance (e.g., toggle rate, switching speed, and so forth) of the integrated circuit subsequent to manufacturing. In some embodiments, the toggle rate of a wire is evaluated during a modeling process considering wires in a same layer of the integrated circuit design. In some embodiments, the toggle rate of a wire is evaluated in a modeling process considering wires in the same layer and in adjoining layers of the integrated circuit design.

Method 360 includes an operation 368 wherein the toggle rate of the selected wire is compared to a toggle rate threshold (or, timing performance, or a switching frequency threshold) of the IC design. When the toggle rate of the selected wire is above the toggle rate threshold (e.g., when the toggle rate of the wire is not slower than the toggle rate threshold), then the method continues to an operation 372. When the toggle rate of the selected wire is below the toggle rate threshold (e.g., when the toggle rate of the wire is slower than the toggle rate threshold), then the operation continues to an operation 370. In some embodiments, increasing the power consumption corresponds to increases in timing performance (e.g., a faster switching speed) of an integrated circuit. However, timing performance increases also occur when the resistance of the integrated circuit is reduced. In some embodiments, the resistance is reduced by modifying the size of a fin in an integrated circuit. In some embodiments, the resistance is reduced by modifying the number of fins in a cell of an integrated circuit. In at least one embodiment, decreasing the unit resistance of a cell of an integrated circuit by about 15% results in a timing performance increase of around 0.5% as compared to an unmodified cell of an integrated circuit. Timing performance of the integrated circuit includes software simulation of switching or toggling performance of FinFETS or transistors, SRAM or DRAM or other memory and/or storage elements, and other circuit features and the interconnects located between them (individually or in blocks). Wiring resistance decreases with wider wires in a layer of an integrated circuit, but capacitance of the wire, and coupling to other wires in the same layer or in a different layer, or to ground, also increases. Thus, timing performance is evaluated in order to determine whether broadening a wire adversely impacts timing.

Wire width adjustment modifies the electrical characteristics of the widened wires. When a wire is widened, a size of the wire is increased and the resistance of the wire decreases. In some instances, width adjustment impacts switching frequency for a widened wire. Switching frequency decreases when the capacitance of the wire increases. Capacitance increases when a separation distance between the widened wire and a neighboring wire in the same layer or a different layer, or coupling to ground, decreases. By modeling the electrical properties of wires after widening, individual wires are targeted for widening adjustment based on the modeled electrical properties. widening adjustment is performed to reduce coupling/capacitance of widened wires. By performing widening adjustment, switching frequencies of widened wires are also adjusted to reduce a distribution of switching frequencies of the integrated circuit elements. Narrowing an overall distribution of switching frequencies improves integrated circuit performance. In some embodiments, narrowing a distribution of switching frequencies includes increasing the average switching frequency of transistors in an integrated circuit. By narrowing the distribution of switching frequencies of an integrated circuit elements, the average switching speed is increased by making slow-switching circuit elements operate at a higher speed because the wires that connect to the slow-switching elements have reduced impedance to the flow of current to or from the circuit elements. Thus, the average switching speed of the integrated circuit increases with wire width adjustment to eliminate parasitic capacitance between adjoining wires, or by to reduce resistance of some wires in the integrated circuit. Integrated circuits with higher clock speed ratings typically sell for higher prices than lower clock speed integrated circuits, making higher clock speed circuits more profitable to manufacture and sell. Some examples of width adjustment include identifying wires at positions in an array of wires that have slow switching speed, relocating a wire adjoining the slow wire to a new position, and widening the slow wire to modify the electrical properties of the slow wire. In some instances, slow wires in an integrated circuit array of wires do not qualify for width adjustment but for the relocation of adjoining wires to create an open position or empty position in the array adjacent to the slow wire.

The method includes operation 370, in which the degree of widening of the selected wire, or a wire adjoining the selected wire in the layer, is adjusted. In some instances, the degree of widening of the wire is adjusted by decreasing the wire width. When a wire in an IC layout is first widened, the width of the wire is adjusted from a first width to a second width, in order to reduce likelihood of manufacturing defects from ruining the wire. A degree of wire widening is related to the size of the change in the wire width. Thus, a degree of width adjustment is approximately proportional to the ratio of the second width divided by the first width. Wires that have the same ratio have the same degree of widening. A first widened wire that has a larger ratio than a second widened wire has a larger degree of widening than the second wire. In some embodiments, the degree of widening remains the same (e.g., the wire width remains the same), but the wire position is adjusted to further separate a widened wire from an adjoining wire). In some embodiments, the wire is relocated to a new position in the integrated circuit design to reduce interactions between wires. According to some embodiments, reducing interactions between neighboring wires of an IC includes at least one of reducing capacitance of a wire with an adjoining wire and/or reducing a capacitance of a wire with a ground of the IC. In some embodiments, the degree of widening of a wire is increased (e.g., the widened width is increased, rather than decreased). In some embodiments, the degree of widening of a wire is decreased, rather than increased (e.g., the wire width is decreased in wire width adjustment). In some embodiments, a degree of widening of two wires at opposite sides of an open position of an array of wires is adjusted subsequent to evaluating electrical performance of the widened wires. In some embodiments, a degree of widening is reduced to zero (e.g., a width of one or more wires of the widened wires is reduced to an original width of the wire).

In some embodiments of width adjustment, wire widths are adjusted by shifting a single side of a wire toward an opening and/or an empty position of an array of wires. In some embodiments of wire width adjustment, wire widths are adjusted by shifting a both sides of a wire toward an opening and/or an empty position of an array of wires. In other words, a center of a wire segment is shifted toward an empty position of an array of wires a distance that is greater than half the adjusted width of the wire. In some embodiments, a wire width adjustment process includes adjusting the degree of widening of one wire adjoining an empty position. In some instances, adjusting the widening of a wire includes partially reversing the widening of the wire. In some instances, adjusting the widening of a wire includes completely reversing the widening of the wire back to an original width of the wire. In some instances, adjusting the widening of a wire includes increasing the widening of a wire in addition to a first amount of widening of the wire in a first widening operation. In some embodiments, a wire width adjustment process includes adjusting the amount of widening of wires adjoining opposite sides of an empty position. In some instances, wire widening is performed by identifying a wire in an array of wires that has an electrical property outside of a specified range for the electrical property, relocating a wire adjacent to the identified wire to a new position in the array of wires, and widening the identified wire to adjust the electrical property to fall within the specified range for the electrical property. In some instances, the electrical property is one or more of resistance, capacitance, ground coupling, and/or switching frequency.

In some embodiments, wire width adjustment is performed on widened wires to regulate capacitance of wires in an integrated circuit. When a wire is widened, the wider wire has a greater potential for capacitive interaction with adjoining wires in the same layer of an integrated circuit, and/or in a layer above or below the layer containing the widened wire. In some embodiments, widened wires in a layer of an integrated circuit have a greater potential for capacitive interaction with a ground connection of the integrated circuit. In some embodiments of integrated circuits, increased capacitive interactions cause signal transmission delays, or reduced toggle frequency, or reduced switching frequency, delaying an operation of a second portion of the integrated circuit to which the widened wire connects. Evaluating the timing characteristics of a wire's performance in an integrated circuit includes an evaluation of when a wire's toggle frequency, or signal transmission rate, meets a target timing constraint (and the wire is non-critical), or fails to meet a target timing constraint (and the wire is timing critical). Evaluation of timing characteristics of an integrated circuit layer, and the wires therein, is performed at different stages of the integrated circuit layout and design process, both before, during, and after wire width adjustment in order to identify and adjust widths of wires prone to manufacturing defects or parasitic capacitance. Subsequent to performing operation 325, the selected wire undergoes the operation 315 of the method 360.

Method 360 includes an operation 372 wherein, for the selected wire of the IC layout, that meets the toggle rate specification of the wire type in the IC layout, the wire is modeled for resistance and capacitance, and/or power consumption performance parameters (e.g., the resistance and capacitance and/or power consumption performance are calculated based on the wire dimensions and the proximity of adjoining features in the IC). The method 360 includes an operation 374, wherein the results of modeling the resistance and capacitance, and power consumption performance parameters are compared to a threshold, or a performance specification of the IC layout. The modeling and comparison of the modeling results are performed, in some embodiments, in a circuit simulation software installed on a computing device that is configured to adjust, according to an instruction by a user, a parameter of at least one wire of the IC layout in order to meet a performance specification of the IC design prior to a manufacturing operation for the IC. When a modeled value of resistance, capacitance, and/or power consumption exceed a threshold value of an IC design specification, the method continues to operation 376. When a modeled value of resistance, capacitance, and/or power consumption falls below a threshold value of an IC design specification, the method continues to operation 378.

In operation 345, similar to operation 370, as described above, the selected wire undergoes a width adjustment and thus become a width-adjusted wire. Wire width adjustment modifies the width and/or position of the wire, or an adjoining wire, in order to modify the resistance, capacitance, and/or power consumption of the wire and/or adjoining wire, in order to produce a wire of the IC design that has a modeled performance for resistance, capacitance, and/or power consumption that falls below a performance threshold of the IC design. Subsequent to operation 376, the selected wire undergoes operation 366 of the method 360.

Method 360 includes an operation 378, determining whether all the wires of the interconnection layer have been evaluated for width adjustment. When less than all the wires of the interconnection layer have been evaluated, the method continues to an operation 364, wherein another wire of the IC layout is selected for modeling and performance evaluation. When all the wires of the interconnection layer have been evaluated, the method continues to an operation 380. Operation 380 includes forming, based on the widening of the wires of the IC design, a computer aided design layout or other computer based electronic design format containing the information about positions of widened wires, and the degree of widening of the wires of each layer of the IC design. The method 360 further comprises an operation 382, in which an integrated circuit is fabricated based on the IC design layout generated in operation 380.

Figure 4B:
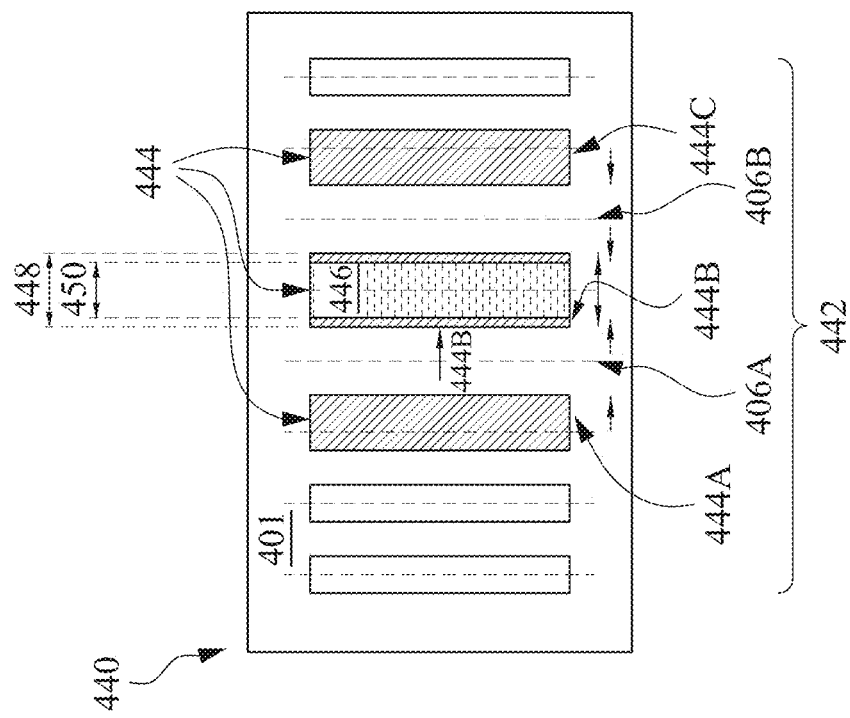
FIGS. 4A and 4B are plan views of wires of an integrated circuit before and after a wire width adjustment process, in accordance with some embodiments.
Figure 4A:
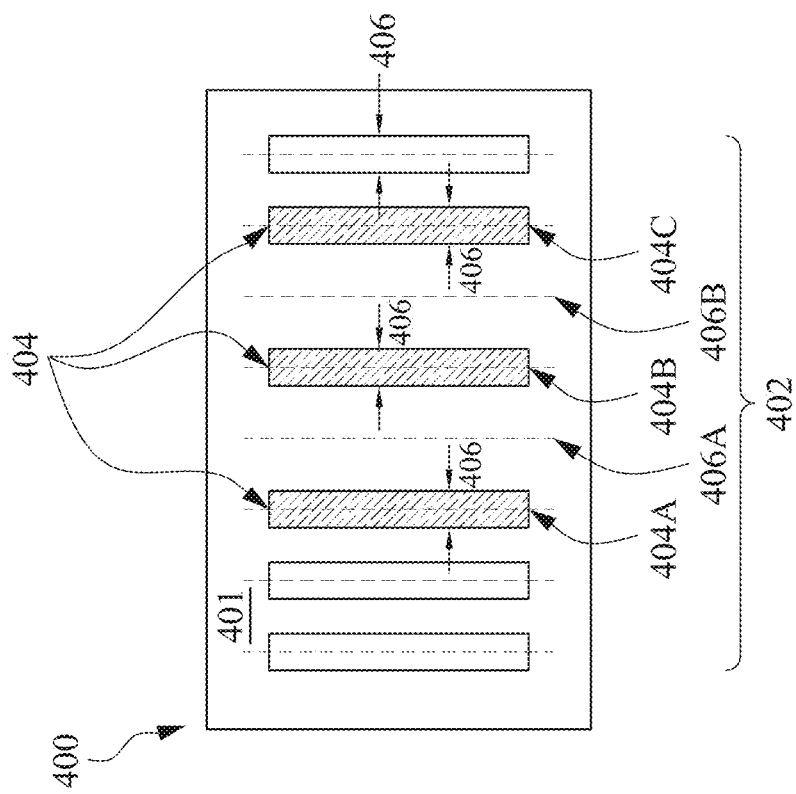

FIGS. 4A and 4B are plan views of wires of an integrated circuit before and after a wire widening process, in accordance with some embodiments. In FIG. 4A, a first layout 400 of an integrated circuit 401 is shown. First layout 400 includes an array of wires 402, with a plurality of wires 404 that qualify for widening. Wire 404A and wire 404B qualify for widening because they adjoin open wire position 406A. Wire 404B and 404C qualify for widening because they adjoin open wire position 406B. Thus, wire 404A can be widened by broadening toward open wire position 406A, wire 404B can be widened by broadening toward open wire position 406A and open wire position 406B, and wire 404C can be widened by broadening toward open wire position 406B. In FIG. 4A, the wires all have an original wire width 406. In some instances, some wires in an array of wires have different original widths dictated by the current load of the individual wires, the sensitivity of the wires to coupling, or other factors of designing the integrated circuit. For purposes of this disclosure, the original wire width 406 is used to the original width of an individual wire, despite any differences between the original widths of wires in a portion of the integrated circuit. The term original wire width is used to distinguish the width of a single wire from the width of the wire subsequent to a wire widening process and/or a wire width adjustment process, performed for the wire.

FIG. 4B is a plan view of a second layout 440 of an integrated circuit 401 subsequent to wire widening. Second layout 440 includes a plurality of wires 442, with open wire positions 406A and 406B, and an array of widened wire 444, including widened wires 444A, 444B, and 444C. Widened wire 444A corresponds, subsequent to wire widening as described above in operation 305, to an unwidened wire 404A. Similarly, widened wire 444B corresponds to unwidened wire 404B, and widened wire 444C corresponds to unwidened wire 404C. Widened wire 444A is widened toward open wire position 406A, widened wire 444C is widened toward open wire position 406B, and widened wire 444B is widened toward both open wire position 406A and open wire position 406B.

In some embodiments, widened wire 444B exceeds a threshold of a performance parameter of the IC 401, and a widening adjustment is performed in order to regulate at least one performance parameter of the IC 401. Thus, the widened wire 444B is replaced, in the second layout 440, with a revised widened wire 446, having a second widened wire width 450 smaller than the first widened wire width 448. Revised widened wire 446 is generated by widening sides of widened wire 44B on both sides of the widened wire, away from both open wire positions 406A and 406B. In some embodiments, a revised widened wire is generated by reducing widening on one side of the widened wire. Unwidened wire 404B (see FIG. 4A) has an original wire width 406. Widened wire 444B has a widened wire width 448, which is greater than original wire width 406. Revised widened wire 446 has a reduced wire width 450, reflecting width adjustment subsequent to widening of wire 404B. In some embodiments, a reduced wire width 450 is smaller than a widened wire width and larger than an original wire width 406. In some embodiments, a reduced wire width 450 is the same as the original wire width 406. In some instances, the reduced wire width 450 is the same as the original wire width 406 upon an evaluation of the electrical properties of the wire resulting in a determination that any wire widening of the wire results in an adverse impact on the integrated circuit, in relation to the electrical properties of the wire with the original wire width.

FIGS. 5A and 5B are plan views of wires of an integrated circuit 501 rearranged in a wire widening process, in accordance with some embodiments. In FIG. 5A, a first circuit layout 500 has a plurality of wires (504A-C, 506, 508, and 510) located at positions in an array of layout positions 502. The array of layout positions 502 includes filled layout positions 502A-C, 502E, and 502G-H and open layout positions 502D and 502F. Wires 504A, 504B, and 504C qualify for wire widening because they adjoin open layout positions 502D and 502F in first circuit layout 500.

In FIG. 5B, second circuit layout 540 includes the array of layout positions 502 subsequent to a wire widening operation during an integrated circuit manufacturing process, as described in FIG. 8, below. In second circuit layout 540, widened wire 544A replaces wire 504A from first circuit layout 500, widened wire 544B replaces wire 504B from first circuit layout 500, and widened wire 544C replaces wire 504C of first circuit layout 500. Widened wire 544A has a widened width 552, widened wire 544B has a widened width 554, and widened wire 544C has a widened width 556. Widened widths 552, 554, and 556 are larger than original width 512. Widened wires 544A, 544B, and 544C remain at the same positions as the original-width wires replaced during wire widening.

Wire 506 moves positions during a wire widening operation. In first circuit layout 500, wire 506 is located at layout position 502B, and layout position 502F is an open position. In second circuit layout, layout position 502B is an open position, and the layout position 502F contains wire 546, corresponding to wire 506. In some embodiments, a wire is moved between layout positions during wire widening in order to allow wire widening into a layout position occupied by a relocated wire in the initial wire layout. In some embodiments, a wire is moved between layout positions in order to promote wire widening of the moved wire at a new filled (formerly open) layout position.

In some embodiments, relocating a wire during wire widening brings the relocated wire and a widened wire into proximity, violating design rules of an integrated circuit. Wire 544C is a widened wire at layout position 502E, and relocated wire 546 is at layout position 502F. Widened wire 544C has a widened width 556, which brings widened wire 544C in proximity with relocated wire 546. Thus, as part of a widening operation of a manufacturing process, the widened width 556 of widened wire 544C is reduced to a re-widened width 558, smaller than the widened width 556. By reducing the degree of widening, a re-widened wire 544D has space between relocated wire 546 and re-widened wire 544D, with sufficient dielectric material of the integrated circuit 501 between the wires to conform to a design rule of the integrated circuit 501. An amount of dielectric material that is sufficient is a function of the current load of a wire, the nature of the dielectric material, the voltage difference between adjacent wires, and other aspects of circuit design related to preventing arcing, short circuits, or parasitic capacitance in integrated circuit 501 at a given technology node or circuit design.

Figure 6B:
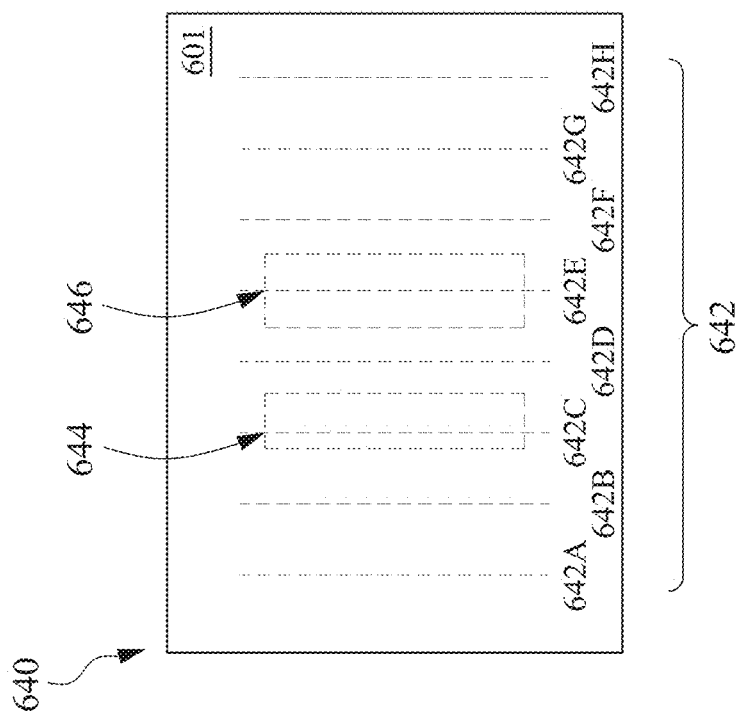
FIGS. 6A and 6B are plan views of locations of wires in an integrated circuit, and locations in a computer aided design (CAD) layout of the integrated circuit, denoting wires subject to wire width adjustment, in accordance with some embodiments.
Figure 6A:
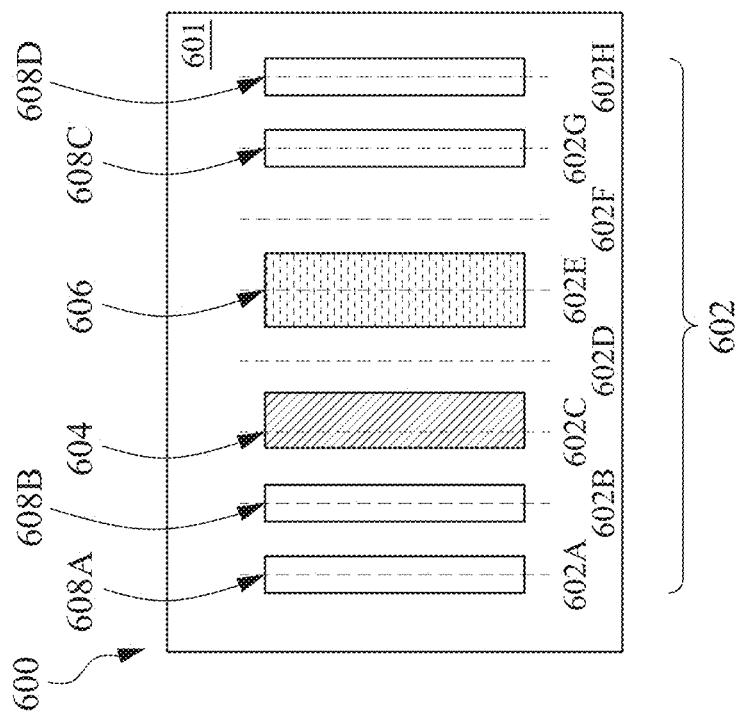

In FIG. 6A a first circuit layout 600 has an array of wire layout positions 602 in an integrated circuit 601. Some of the wire layout positions 602 are populated by wires. Wires 604 and 606 are widened wires, and wires 608A-D are unwidened wires of the integrated circuit 601. Wire 604 is widened toward open layout position 602D, and wire 606 is widened toward open positions 602D and 602F. In FIG. 6B, a computer aided design (CAD) layout 640 of the integrated circuit 601 with an array of wire positions 642 corresponding to the array of wire positions 602 in the first circuit layout 600. CAD layout 640 includes information about widened wires of first circuit layout 600, including positions of widened wires in the layout 640. Widened wire 604 at layout position 602C of first circuit layout 600 corresponds to widened wire marker 644 at array position 642C of CAD layout 640. Similarly, widened wire 606 at layout position 602E of first circuit layout 600 corresponds to widened wire marker 646 at array position 642E of CAD layout 640.

CAD layout 640 includes widened wire marker information. Widened wire marker information provides, to a patterning template maker (such as a photolithography or electron beam reticle manufacturer) information about wire widths, wire lengths, corrective features, and other aspects related to making an array of wires in an integrated circuit using the patterning information. In some embodiments, CAD layout 640 includes only widened wire marker information. In some embodiments, CAD layout 640 includes a combination of widened wire marker information and unwidened wire marker information. Widened wire marker information provides patterning template manufacturers information about wire widths, wire locations, corrective features, and other aspects related to making an array of wires in an integrated circuit. Widened wire marker information correlates with layout positions in a first circuit layout. Patterning templates such as photolithography reticles, electron beam reticles, or other devices used to generate patterns in masking material on an integrated circuit substrate are manufactured based on the wire marker information. Wire marker information acts as a translation step between a CAD file which describes the layout of features in the integrated circuit, and a layout file which describes features of the radical or other patterning template. In some instances, a patterning template layout is generated based on a CAD file describing the layout of lines in an integrated circuit, and the patterning template layout needs to be modified subsequent to a wire widening operation. Widened wire markers such as widened wire marker 646 include information relevant to modifying patterning template layouts to target modifications to the patterning template layout only to regions where widened wires are located in an integrated circuit layout.

Figure 7:
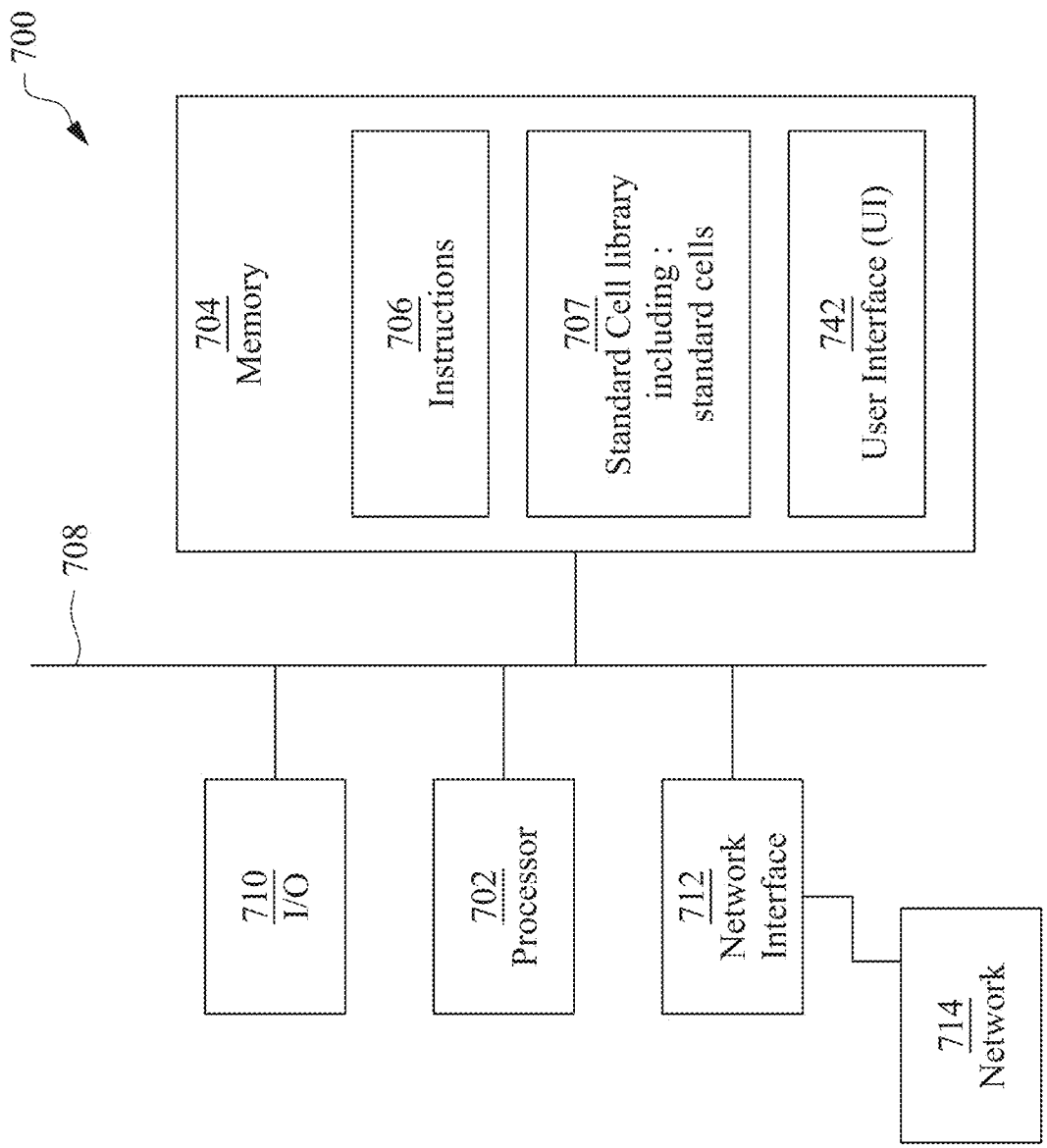
FIG. 7 is a schematic view of a system for designing an integrated circuit layout design according to some embodiments.

FIG. 7 is a block diagram of an electronic design automation (EDA) system 700, in accordance with some embodiments. Methods described herein of generating cell layout diagrams, in accordance with one or more embodiments, are implementable, for example, using EDA system 700, in accordance with some embodiments. In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., a set of executable instructions. Execution of instructions 706 by hardware processor 702 represents (at least in part) an EDA tool which implements a portion or all of, e.g., the methods described herein in accordance with one or more (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 (or, program instructions) configured to cause system 700 (where such execution represents, at least in part, the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells as disclosed herein.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

System 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
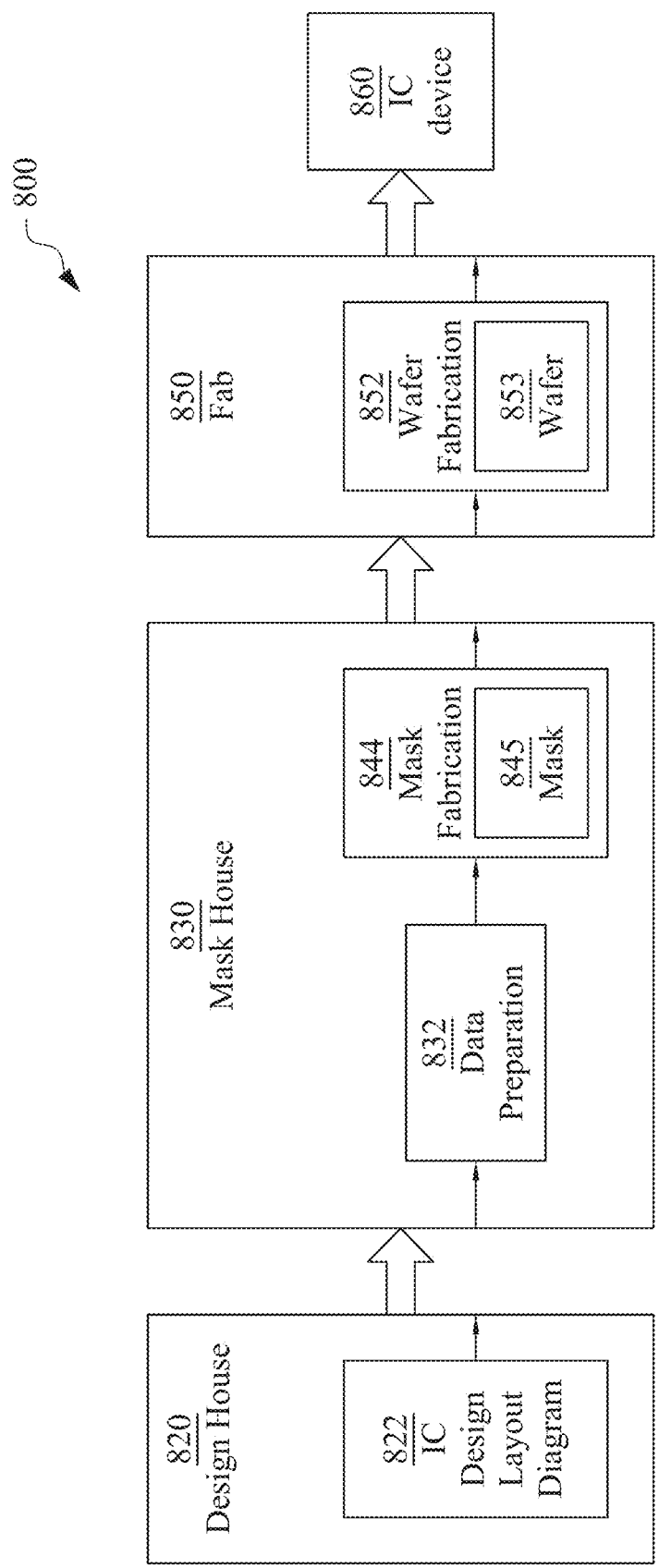
FIG. 8 is a block diagram of a manufacturing system for making integrated circuits, according to some embodiments.

FIG. 8 is a block diagram of an integrated circuit (IC) manufacturing system 800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, conductive lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (e.g., a photomask, or a reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-layer interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oc. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

Wire widening is a technique employed to reduce the frequency of circuit-killing defects from occurring during a manufacturing process. Wire widening modifies electrical performance characteristics of an integrated circuit, increasing capacitance and reducing resistance of wires in the integrated circuit. Wire width adjustment is a process of reviewing performance of widened wires in integrated circuits and determining, among the set of widened wires, which wires have a negative impact on timing of circuit elements, and reducing the degree of widening of the wires that negatively impact circuit timing. Some embodiments of wire widening include widening wires that adjoin one empty layout position in an integrated circuit. Some embodiments of wire widening include an operation of relocating one or more wires to widen the relocated wire, and/or widen a wire adjoining the layout position of the relocated wires. In some embodiments, a wire adjoining the layout position of the relocated wire is widened because the wire has a switching frequency that is outside a specification for the circuit, and a combination of wire relocation and wire widening operations modifies the switching frequency to fall within a specification for the circuit.

Aspects of the present disclosure relate to a semiconductor device which includes a first circuit element; a layer of dielectric material; and an array of wires in the dielectric material, wherein a first wire of the array of wires overlapping a first track is electrically connected to the first circuit element, wherein the first wire has a first width, a second wire of the array of wires overlapping a second track, wherein the second wire has a second width different from the first width, and a third track between the first track and the second track is an empty track, and wherein the first wire is asymmetric with respect to the first track, the first track and the third track are separated by a first separation distance, and the third track and the second track are separated by the first separation distance. In some embodiments, the first wire comprises a first portion between the first track and the third track, and a second portion on an opposite side of the first track from the third track, wherein the first portion is wider than the second portion. In some embodiments, the second wire is asymmetric with respect to the second track. In some embodiments, the second wire comprises a first portion between the second track and the third track, and a second portion on an opposite side of the second track from the third track, wherein the first portion is wider than the second portion. In some embodiments, the second wire comprises a first portion between the second track and the third track, and a second portion on an opposite side of the second track from the third track, wherein the second portion is wider than the first portion. In some embodiments, the semiconductor device includes a third wire of the array of wires overlapping a fourth track, wherein the third wire has a third width, the first track is between the third track and the fourth track, and the third wire is symmetric with respect to the fourth track. In some embodiments, the third width is less than the first width, and the third width is less than the second width. In some embodiments, the second wire is symmetric with respect to the second track. In some embodiments, the semiconductor device includes a third wire of the array of wires overlapping a fourth track, wherein the third wire has a third width different from the second width, and the second track is between the third track and the fourth track; and a fifth track, wherein the fifth track is an empty track, and the fourth track is between the second track, and the fifth track. In some embodiments, the second width is greater than the third width, and the third wire is asymmetric with respect to the fourth track. In some embodiments, the first width is equal to the third width.

Aspects of the present disclosure relate to a method which includes steps of selecting a first wire in a layout of wires, wherein a position adjacent to the first wire is an empty position, wherein the first wire has an original wire width; widening the first wire to become a widened first wire having a first width; calculating a performance result of the first widened wire, with regard to a first parameter; comparing the performance result of the widened first wire to a first predetermined threshold; and determining whether the performance result exceeds a specification threshold. In some embodiments, the method includes steps of calculating a power consumption of a circuit element electrically connected to the widened first wire; and adjusting the first widened wire to have a second width to further modify the power consumption of the circuit element. In some embodiments, widening the first wire comprises increasing a width of the first wire while preserving at least a minimum separation distance between the widened first wire and a nearest wire in the layout of wires. In some embodiments, the method further includes steps of selecting a second wire in the layout of wires, at an opposite side of the empty position from the first wire; widening the second wire to become a widened second wire; calculating a performance of the second widened wire, with regard to the first parameter, and comparing the performance result of the widened second wire to a second predetermined threshold. In some embodiments, the method further includes steps of calculating a capacitance of the widened first wire with respect to the widened second wire; determining whether the capacitance of the widened first wire exceeds a performance specification of the widened first wire; and adjusting at least one of the widened first wire and the widened second wire to modify the capacitance of the widened first wire and the widened second wire in response to the capacitance exceeding the performance specification.

Aspects of the present disclosure relate to a method with steps related to selecting a first wire in an array of wires wherein the first wire has a first width and is adjoined by a first open track; adjusting a width of the first wire to a second width according to a resistance/capacitance (RC) table for a semiconductor device design; calculating a switching speed of a first circuit element electrically connected to the widened first wire; determining whether the switching speed of the first circuit element exceeds a performance specification; and reducing the adjusted width of the first wire, wherein the first wire, subsequent to reducing the adjusted width, has a third width less than the second width, and a second switching speed, in response to determining the switching speed of the first circuit element exceeds the performance specification. In some embodiments, the method includes steps for adjusting a width of a second wire in the array of wires on an opposite side of the open track from the first wire, wherein the adjusting the width of the second wire comprises extending the second wire toward the open track between the first wire and the second wire. In some embodiments, the method includes steps for determining whether the switching speed of the first circuit element exceeds the performance specification; and reversing the adjusting of the second wire in response to determining that the switching speed of the first circuit element exceeds the performance specification. In some embodiments, the method includes steps for selecting a second wire in the array of wires wherein the second wire has a third width and adjoined by the first open track and a second open track; adjusting the second wire to have a fourth width larger than the third width; and reducing the adjusted width of the second wire to a fifth width based on determining that the switching speed of the first circuit element exceeds the performance specification.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
selecting a first wire occupying a first position in a layout of a plurality of parallel wires arranged over a subset of a plurality of evenly spaced positions to provide at least a minimum separation distance between adjacent ones of the plurality of parallel wires,
wherein a second position adjacent to the first position is an empty position,
wherein the first wire has an original wire width;
widening the first wire in the direction of the empty position to form a widened first wire having a first width;
calculating a performance result of the widened first wire, with regard to a first parameter;
comparing the performance result of the widened first wire to a first predetermined threshold; and
determining whether the performance result exceeds a specification threshold.

2. The method of claim 1, further comprising:
calculating a power consumption of a circuit element electrically connected to the widened first wire; and
adjusting the first widened wire to have a second width to further modify the power consumption of the circuit element.

3. The method of claim 1, wherein widening the first wire comprises increasing a width of the first wire while preserving at least the minimum separation distance between the widened first wire and a second wire at a third position separated from the first position by the second position in the layout of wires.

4. The method of claim 1, further comprising:
widening the second wire in the direction of the widened first wire to form a widened second wire while maintaining the minimum separation distance between the widened first wire and the widened second wire;
calculating a performance of the second widened wire, with regard to the first parameter; and
comparing the performance result of the widened second wire to a second predetermined threshold.

5. The method of claim 4, further comprising:
calculating a capacitance of the widened first wire with respect to the widened second wire;
determining whether the capacitance of the widened first wire exceeds a performance specification of the widened first wire; and
adjusting at least one of the widened first wire and the widened second wire to modify the capacitance of the widened first wire and the widened second wire in response to the capacitance exceeding the performance specification.

6. A method, comprising:
selecting a first wire in an array of wires wherein the first wire has a first width and is adjoined by a first open track;
adjusting a width of the first wire to a second width in a direction toward the first open track according to a resistance/capacitance (RC) table for a semiconductor device design;
calculating a switching speed of a first circuit element electrically connected to the first wire;
determining whether the switching speed of the first circuit element exceeds a performance specification; and
reducing the second width of the first wire, wherein the first wire, subsequent to reducing the second width, has a third width less than the second width, and a second switching speed, in response to determining the switching speed of the first circuit element exceeds the performance specification.

7. The method of claim 6, further comprising adjusting a width of a second wire in the array of wires on an opposite side of the first open track from the first wire, wherein the adjusting the width of the second wire comprises extending the second wire toward the first open track between the first wire and the second wire.

8. The method of claim 7, further comprising
determining whether the switching speed of the first circuit element exceeds the performance specification; and
partially reversing the adjusting of the second wire in response to determining that the switching speed of the first circuit element exceeds the performance specification.

9. The method of claim 6, further comprising
selecting a second wire in the array of wires wherein the second wire has a third width and is adjoined by the first open track and a second open track;
adjusting the second wire to have a fourth width larger than the third width; and
reducing the fourth width of the second wire to a fifth width based on determining that the switching speed of the first circuit element exceeds the performance specification.

10. A method, comprising:
selecting a first wire in a wiring layout, wherein the first wire has a first original width, and a position adjacent to the first wire is occupied by a second wire;
relocating the second wire to a previously empty position in the wiring layout;
widening the first wire to have a first adjusted width;
calculating a performance result of the first wire having the first adjusted width, with regard to a first parameter;
comparing the performance result of the first wire having the first adjusted width to a first predetermined threshold; and
determining whether the performance result meets a specification threshold.

11. The method of claim 10, further comprising:
selecting a third wire in the wiring layout, wherein the third wire has a second width and wherein the second wire is in a position adjacent both the first wire and the third wire;
widening the third wire to have a second adjusted width;
calculating a second performance result of the third wire having the second adjusted width, with regard to the first parameter;
comparing the second performance result of the third wire having the second adjusted width to the first predetermined threshold; and
determining whether the second performance result meets a second specification threshold.

12. The method of claim 11, further comprising:
calculating a third performance result of the third wire having the second adjusted width, with regard to a second parameter;
comparing the second performance result of the third wire having the second adjusted width to a second predetermined threshold; and
determining whether the third performance result meets a third specification threshold.

13. The method of claim 10, wherein:
the first wire has an original longitudinal axis;
the first wire having the first adjusted width has a second longitudinal axis; and
the original longitudinal axis is offset from the second longitudinal axis in a first direction perpendicular to the original longitudinal axis.

14. The method of claim 10, wherein:
the first wire has an original longitudinal axis;
the first wire having the first adjusted width has a second longitudinal axis; and
the original longitudinal axis is coaxial with the second longitudinal axis.

15. The method of claim 10, further comprising:
widening the first wire in a first direction from an original longitudinal axis of the first wire.

16. The method of claim 15, further comprising:
widening the first wire in a second direction from the original longitudinal axis of the first wire, wherein the first direction is opposite the second direction.

17. The method of claim 16, further comprising:
widening the first wire by a first distance in the first direction; and
widening the first wire by a second distance in the second direction.

18. The method of claim 17, wherein:
the first distance and the second distance are equal.

19. The method of claim 10, further comprising:
determining a first spacing between the second wire and a fourth wire adjacent the second wire;
comparing the first spacing with a minimum wire spacing rule; and
in response to the first spacing failing to satisfy the minimum wire spacing rule, reducing a width of the fourth wire by a reduction distance to form a reduced width fourth wire.

20. The method of claim 19, further comprising:
calculating a fourth performance result of the reduced width fourth wire, with regard to the first parameter;
comparing the fourth performance result of the reduced width fourth wire to the first predetermined threshold; and
determining whether the fourth performance result meets the specification threshold.

21. The method of claim 6, wherein the first wire is adjoined by a second wire and a third wire, further comprising:
relocating the third wire to a previously empty position in the wiring layout, thereby forming the first open track.

* * * * *